United States Patent
Rezaei

(10) Patent No.: US 12,061,276 B2
(45) Date of Patent: Aug. 13, 2024

(54) PERCEPTION DATA BASED GNSS MULTIPATH IDENTIFICATION AND CORRECTION

(71) Applicant: GM Cruise Holdings LLC, San Francisco, CA (US)

(72) Inventor: Shahram Rezaei, Danville, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/890,185

(22) Filed: Aug. 17, 2022

(65) Prior Publication Data

US 2022/0390619 A1    Dec. 8, 2022

Related U.S. Application Data

(63) Continuation of application No. 16/830,496, filed on Mar. 26, 2020, now Pat. No. 11,454,727.

(51) Int. Cl.
*G01S 19/42* (2010.01)
*G01S 19/25* (2010.01)
*G01S 19/51* (2010.01)

(52) U.S. Cl.
CPC .......... *G01S 19/428* (2013.01); *G01S 19/252* (2013.01); *G01S 19/423* (2013.01); *G01S 19/51* (2013.01)

(58) Field of Classification Search
CPC .... G01S 19/428; G01S 19/252; G01S 19/426; G01S 19/51
USPC .... 342/450, 22, 104, 175, 368, 457; 340/8.1
See application file for complete search history.

(56) References Cited

U.S. PATENT DOCUMENTS

2008/0143482 A1 * 6/2008 Shoarinejad .......... G01S 13/878
340/8.1

* cited by examiner

*Primary Examiner* — Bo Fan

(57) ABSTRACT

Perception data based multipath identification and correction is based on recognition that sensors such as radar, LIDAR, and cameras can generate perception data indicative of locations and properties of terrestrial objects in an environment surrounding a satellite navigation device (e.g., a GNSS receiver), which data may then be used in training, or updating, a model for determining or correcting distances to satellites to account for multipath. Multipath identification includes identifying multipaths to train the model, e.g., by using perception data to perform ray tracing. Multipath correction includes using the model to correct distance errors due to the multipaths or, equivalently, using the model to determine distances to satellites in a manner that accounts for the multipaths.

20 Claims, 8 Drawing Sheets

PERCEPTION DATA BASED GNSS MULTIPATH IDENTIFICATION AND CORRECTION

TECHNICAL FIELD OF THE DISCLOSURE

This continuation application claims the benefit of priority to U.S. Non-Provisional patent application Ser. No. 16/830, 496 filed Mar. 26, 2020, entitled "PERCEPTION DATA BASED GNSS MULTIPATH IDENTIFICATION AND CORRECTION", which is hereby incorporate by reference in its entirety.

TECHNICAL FIELD OF THE DISCLOSURE

The present disclosure relates generally to geo-spatial positioning systems and, more specifically, to devices and methods for applying multipath identification and correction to satellite navigation signals.

BACKGROUND

Global Navigation Satellite System (GNSS) receivers are devices that provide geo-spatial positioning (i.e., location/ geographical position) and time information based on signals transmitted by satellites orbiting the Earth. A GNSS receiver works based on the principal of triangulation, where it estimates the time of flight (TOF) of the GNSS satellite signals received from at least 3 satellites, uses the TOF to compute the distance to each of the satellites, and determines its location (e.g., defined in terms of longitude, latitude, and altitude/elevation) based on the computed distances. Multipath is a known phenomenon that often compromises accuracy of GNSS receivers, especially in dense urban areas where high-rise buildings may obscure the line-of-site from some satellites to some receivers. In particular, multipath cases the TOF to become longer, resulting in an error in determining the distance to a satellite. Because ubiquitous mobile phones, tablets, digital cameras, and many other electronic devices are now routinely equipped with GNSS receivers for providing position and time information to their users, improvements in addressing multipath to increase the accuracy of GNSS receivers are always desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
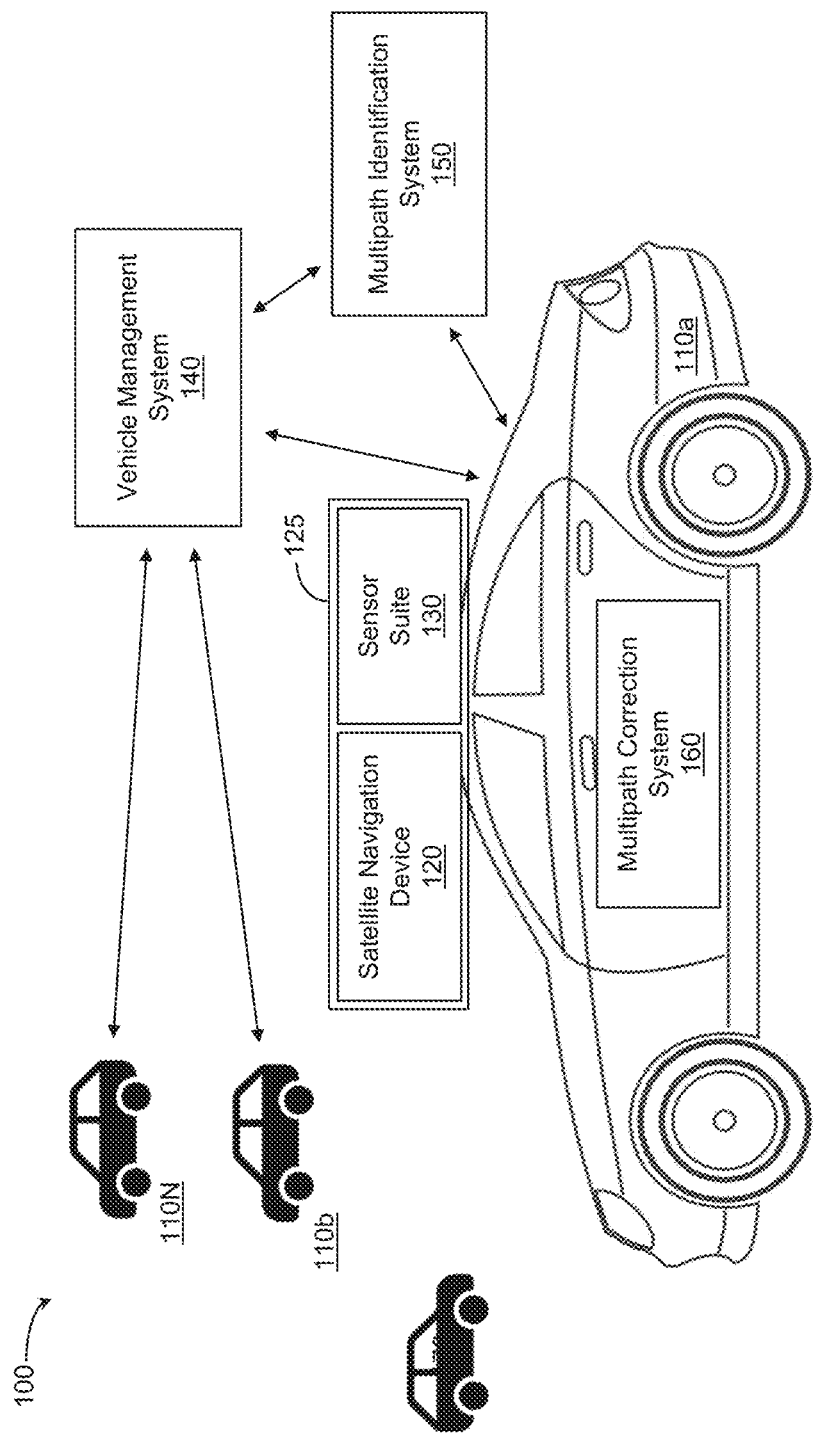
FIG. 1 is a block diagram illustrating a system including an example autonomous vehicle (AV) in which at least some aspects perception data based multipath identification and correction according to some embodiments of the present disclosure may be implemented.

The systems, methods and devices of this disclosure each have several innovative aspects, no single one of which is solely responsible for all of the desirable attributes disclosed herein. Details of one or more implementations of the subject matter described herein are set forth below and the accompanying drawings.

For purposes of illustrating perception based multipath identification and correction, proposed herein, it might be useful to first understand phenomena that may come into play in global positioning systems. The following foundational information may be viewed as a basis from which the present disclosure may be properly explained. Such information is offered for purposes of explanation only and, accordingly, should not be construed in any way to limit the broad scope of the present disclosure and its potential applications.

GNSS refers generically to satellite based navigation systems. The Global Positioning System (GPS) is one of such systems. Because the GPS is the oldest and currently the main system, GNSS receivers are often colloquially referred to as "GPS receivers" or simply "GPS."

In a GNSS system, a satellite constellation of about 15-30 satellites orbits around the Earth. The satellites periodically transmit ranging and navigation information via radio frequency (RF) signals. Ranging information included in a satellite signal allows a GNSS receiver to determine the TOF of the signal. Navigation information included in a satellite signal includes information indicative of satellite orbit models and allows a GNSS receiver to determine the location of the satellite that transmitted the signal. GNSS receivers are devices configured to receive the signals transmitted by such satellites. A GNSS receiver that received signals transmitted by at least 3 different satellites can determine its own location based on the distances to the satellites (which the receiver can determine based on the TOF determined from the satellite signals) and based on the locations of the satellites (which the receiver can determine based on the navigation information included in the satellite signals).

Using suitable software, the receiver may display the location on a map, offer routing directions, or provide other geo-related services.

One challenge with GNSS positioning is that, in some situations, a satellite signal transmitted by a satellite may not reach a receiver by a direct LOS path. Instead, a path of such satellite signal to the receiver may include multiple paths at an angle to one another, a phenomenon known as "multipath." Major causes of multipath include reflection from terrestrial objects such as buildings and trees. Multipath affects position accuracy because a signal received by multipath appears to have traveled longer than it would have traveled by a direct path, resulting in an error in determining the distance to the satellite. Standard GNSS receivers such as the ones currently used in mobile phone or vehicles normally have 2-3 meter level accuracy in open sky conditions (e.g., on a freeway), but can experience errors of several tens of meters in deep urban canyon environments (e.g., in the San Francisco financial district) where high-rise buildings obscure the LOS.

Embodiments of the present disclosure are based on recognition that sensors such as radar sensors, light detection and ranging (LIDAR) sensors, and cameras can generate perception data indicative of locations and properties of terrestrial objects in an environment surrounding a GNSS receiver (or, more generally, a satellite navigation device). The perception data may then be used in training, or updating, a model that can be used by a GNSS receiver for determining or correcting distances to satellites to account for multipath. In the following, such a model may be referred to as a "multipath error model." To that end, aspects of the present disclosure may be divided into multipath identification, which includes identifying the multipaths to train the model (e.g., by using perception data to perform ray tracing), and multipath correction, which includes using the model to correct distance errors due to the multipaths or, equivalently, using the model to determine distances to satellites in a manner that accounts for the multipaths.

In one aspect of the present disclosure, perception data based multipath identification may include collecting data sets where each data set includes at least three components: 1) satellite signals received by a satellite navigation device at a certain location, 2) perception data generated by one or more sensors when the satellite navigation device was at the location where it received the satellite signals, and 3) an accurate estimation of the exact location of the satellite navigation device at the time when it received the signals. The first component of such a data set may be provided by a satellite navigation device, e.g., a GNSS receiver. The second component may be provided by one or more sensors arranged at a certain known location with respect to the satellite navigation device (e.g., both the satellite navigation device and the one or more sensors may be installed on a single AV that may drive around and collect data) so that perception data indicative of the surrounding of the one or more sensors may be considered indicative, or may be extended to be indicative of, the surrounding of the satellite navigation device. The third component may be provided by a further system, e.g., a proprietary system capable of accurate location determination in an area where the data collection for training the model is taking place. The accurate location of the satellite navigation device enables accurate determination of the distances between the satellite navigation device and the satellites. The distances determined in this manner and the locations of the satellites, known from the received satellite signals or downloaded from an external source such as server, may then be combined with the perception data to perform ray tracing to identify which of the received satellite signals interacted with (e.g., were reflected or refracted by) the objects in the environment surrounding the satellite navigation receiver. Performing ray tracing allows identifying the paths of how the received satellite signals reached the receiver, thus identifying which signals reached the receiver by multipath. The identified multipaths, along with the accurate distance to and locations of the satellites, may then be used to train the multipath error model to correct errors arising due to multipath when distances to satellites are determined based on the satellite signals. In the following, in order to differentiate the multipaths generated by ray tracing from the general phenomena of multipath, the multipaths generated by ray tracing may be referred to as "non-line-of-sight (NLOS) paths."

In another aspect of the present disclosure, perception data based multipath correction may include a satellite navigation device, which could be the same as, but typically would be different from, the satellite navigation device used to collect data for the perception data based multipath identification. Such satellite navigation device may be configured to receive a plurality of satellite signals. The satellite navigation device may also be configured to apply the multipath error model trained using the perception data based multipath identification to correct for the multipath errors in determining distances to various satellites. Once the distances have been corrected, the satellite navigation device may proceed with any of the conventional approaches of determining its location based on the distances to a plurality of satellites.

As will be appreciated by one skilled in the art, aspects of the present disclosure, in particular aspects of perception data based multipath identification and correction, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems. For example, a computer program implementing various aspects of perception data based multipath identification as described herein may be downloaded to the existing AVs and/or their controllers, etc., or be stored upon manufacturing of these devices and systems. In another example, a computer program implementing various aspects of perception data based multipath correction as described herein may be downloaded to the existing satellite navigation devices such as GNSS/GPS receivers (which may be included in any electronic device, a vehicle, etc.) and/or their controllers, etc., or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example AV for Collecting Data for Training a Multipath Error Model

In some embodiments, data collection for perception data based multipath identification and correction as described herein may be performed by one or more, e.g., a fleet, of AVs (which may include semi-autonomous vehicles) because such vehicles are already typically equipped with a satellite navigation device and a plurality of sensors. An example of such AVs is shown in FIG. 1. However, in other embodiments, the data collection for the perception data based multipath identification and correction as described herein may be performed by any other systems that include the satellite navigation device 120 and one or more sensors of the sensor suite 130 shown in FIG. 1 (e.g., by non-autonomous vehicles, bicycles, etc.) or may be performed manually (e.g., by a person walking around).

FIG. 1 is a block diagram illustrating a system 100 including an example AV in which at least some aspects of perception data based multipath identification and correction according to some embodiments of the present disclosure may be implemented. As shown in FIG. 1, the system 100 may include a fleet of AVs 110, including AV 110a, AV 110b, and AV 110N. For example, a fleet of AVs may include a number N of AVs, e.g., AV 110a through AV 110N. Taking the AC110a as an example of AVs 110, as shown in FIG. 1, the AV 110a may include a satellite navigation device 120 and a sensor suite 130. In some embodiments, AV 110a may also include a multipath correction system 160. Each of AVs 110b through 110N also includes the satellite navigation device 120 and the sensor suite 130, and may, optionally, include the multipath correction system 160. A single AV in the fleet is referred to herein as AV 110, and the fleet of AVs is referred to collectively as AVs 110.

Each AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include one or more of a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc. The AV 110 may have various internal and external lights. For example, the AV 110 may have one or more of headlights, fog lights, high beams, running lights, brake lights, tail lights, license plate lights, external displays, interior lights, etc.

When included in AVs 110, the sensor suite 130 may include a computer vision ("CV") system, localization sensors, and driving sensors. For example, the sensor suite 130 may include photodetectors, cameras, radar, sonar, LIDAR, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the AV 110.

An onboard computer (not shown in FIG. 1) may be connected to the sensor suite 130 and configured to control the AV 110 and to process sensed data from the sensor suite 130 and/or other sensors in order to determine the state of the AV 110. Based upon the vehicle state and programmed instructions, the onboard computer may modify or control behavior of the AV 110. In some embodiments, the onboard computer may be a general-purpose computer adapted for input/output (I/O) communication with vehicle control systems and the sensor suite 130, but may additionally or alternatively be any suitable computing device. In some embodiments, the onboard computer may be connected to the Internet via a wireless connection (e.g., via a cellular data connection). Additionally or alternatively, the onboard computer may be coupled to any number of wireless or wired communication systems.

The satellite navigation device 120 and the sensor suite 130 may be used to collect data for training a model for determining or correcting distances to satellites based on signals transmitted by the satellites (i.e., for training the multipath error model). In particular, the satellite navigation device 120 may be configured to receive and process navigation signals transmitted by satellites, while the sensor suite 130 may be configured to generate perception data indicative of the location and one or more properties of a plurality of objects in an environment surrounding the sensor suite 130. In general, the satellite navigation device 120 and the sensor suite 130, or portions thereof, may be placed in any suitable locations within the AV 110. As long as their locations with respect to one another are known, the sensor data generated by the sensor suite 130 may be considered, or may be processed to be, representative of the environment surrounding the satellite navigation device 120 so that ray tracing may be performed to determine the paths traveled by the satellite signals received by the satellite navigation device 120. FIG. 1 shows a box 125 around the satellite navigation device 120 and the sensor suite 130 to illustrate that the satellite navigation device 120 and the sensor suite 130 may be considered as a part of a module (which ensures that their positions with respect to one another are known) for collecting data for training the multipath error model as described herein. The satellite navigation device 120 and the sensor suite 130 are described further in relation to FIGS. 2 and 3, respectively.

The AVs 110 may be communicatively connected to (i.e., configured to exchange data with) a vehicle management system 140 and a multipath identification system 150, shown in FIG. 1. In some embodiments, the vehicle management system 140 and the multipath identification system 150 may also be communicatively connected. The vehicle management system 140 may automatically schedule collection of data performed by the AVs 110 and/or provide various information to the AVs 110 which may be relevant to data collection.

In some embodiments, the vehicle management system 140 may be configured to manage the fleet of AVs 110. For example, the vehicle management system 140 may manage a service that provides or uses the AVs 110, e.g., a service for collecting data for training the multipath error model using the satellite navigation device 120 and the sensor suite 130. In some embodiments, the vehicle management system 140 may manage other services that provide or use the AVs 110, such as a service for providing rides to users using the AVs 110, or a service that delivers items using AVs (e.g., prepared foods, groceries, packages, etc.). In another example, the vehicle management system 140 may select an AV from a fleet of AVs to perform a particular service or other task, and instruct the selected AV (e.g., AV 110a) to drive to a particular area/location (e.g., an area/location where data for training the multipath error model is to be collected). In some embodiments, the vehicle management system 140 may also manage fleet maintenance tasks, such as fueling, inspecting, and servicing of the AVs 110. As shown in FIG. 1, each of the AVs 110 may be communicatively connected with the vehicle management system 140. For example, the AVs 110 and vehicle management system 140 may connect over a public network, such as the Internet. The vehicle management system 140 is described further in relation to FIG. 4.

The multipath identification system 150 may use the data collected by the AVs 110 to identify multipaths to train a model for determining or correcting distances to satellites to account for multipath, i.e., to train the multipath error model. The multipath identification system 150 is described further in relation to FIG. 5. Once trained, the model generated by the multipath identification system 150 may be used in the multipath correction system 160 to correct distance errors due to the multipaths or determine distances to satellites in a manner that accounts for the multipaths. The multipath correction system 160 is described further in relation to FIG. 6. Additionally or alternatively to being included in the AVs 110, the multipath correction system 160 may be included in any electronic device to improve location determination of said device, e.g., in an electronic device 170, illustrated in FIG. 1. The electronic device 170 is described further in relation to FIG. 7.

Additionally or alternatively to being included in the AVs 110, the satellite navigation device 120 and the sensor suite 130 described herein may be included in systems, modules, or devices other than the AVs 110.

Example Satellite Navigation Device

Figure 2:
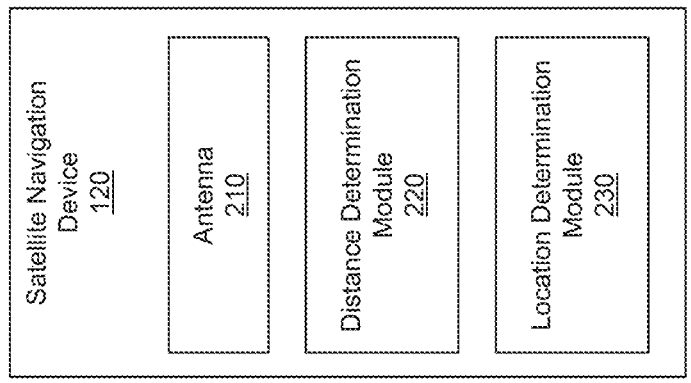
FIG. 2 is a block diagram illustrating a satellite navigation device according to some embodiments of the present disclosure.

FIG. 2 is a block diagram illustrating details of the satellite navigation device 120 according to some embodiments of the present disclosure. As shown in FIG. 2, the satellite navigation device 120 may include an antenna 210, a distance determination module 220, and a location determination module 230. In alternative configurations, different and/or additional components may be included in the satellite navigation device 120. Further, functionality attributed to one component of the satellite navigation device 120 may be accomplished by a different component included in the satellite navigation device 120 or a different system than those illustrated.

The antenna 210 may include any suitable device for receiving RF signals from the satellites. The signals transmitted by the satellites include information from which their location at the time of the transmission can be determined and information from which the TOF of the signals can be determined (e.g., pseudo-random sequences of bits which the satellite navigation device 120 can use to determine the TOF of the signals as known in the art). The distance determination module 220 may be configured to compute the distance between the satellite navigation device 120 and a satellite based on the TOF of the signal that was transmitted by the satellite. The location determination module 230 may be configured to determine a location of the satellite navigation device 120 based on the computed distances to at least 3 satellites, e.g., using triangulation. The results output by the distance determination module 220 and the location determination module 230 may be used by the multipath identification system 150 to train the model. While the distance determination module 220 and the location determination module 230 are shown as a component of the satellite navigation device 120, in some embodiments, one or both of the distance determination module 220 and the location determination module 230 may be implemented outside of the satellite navigation device 120, e.g., in the multipath identification system 150, in the multipath correction system 160, at a cloud server, etc.

Example Sensor Suite

Figure 3:
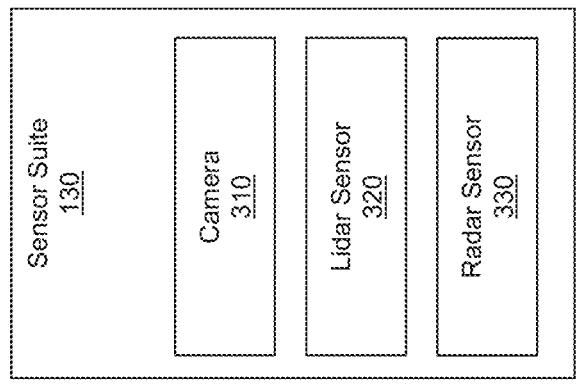
FIG. 3 is a block diagram illustrating a sensor suite according to some embodiments of the present disclosure.

FIG. 3 is a block diagram illustrating details of the sensor suite 130 according to some embodiments of the present disclosure. In some embodiments, the sensor suite 130 may include multiple types of sensors, each of which may have different attributes and advantages. Combining data from many multiple sensors and different sensor types allows the AV 110 to obtain a more complete view of its environment and allows the AV 110 to learn about its environment in different conditions, e.g., at different travel speeds, and in different lighting conditions. Extending this to the embodiments where the sensor suite 130 may be included in the AV 110 or included in the module 125 that is not included in the AV 110 but is still used for collecting data for training the multipath error model, combining data from many multiple sensors and different sensor types allows the module 125 to obtain a more complete view of its environment. In particular, combining data from many multiple sensors and different sensor types of the sensor suite 130 allows obtaining locations and properties of the objects surrounding the satellite navigation device 120 so that ray tracing may be performed to determine the paths traveled by the satellite signals received by the satellite navigation device 120.

For example, as shown in FIG. 3, the sensor suite 130 may include a camera 310, a LIDAR sensor 320, and a radar sensor 330. In other embodiments, different and/or additional components may be included in the sensor suite 130. For example, the sensor suite 130 may also include photodetectors, sonar, GPS, wheel speed sensors, IMUs, accelerometers, microphones, strain gauges, pressure monitors, barometers, thermometers, altimeters, etc., as described with respect to FIG. 1. Further, while one camera 310, one LIDAR sensor 320, and one radar sensor 330 are shown in FIG. 3, the sensor suite 130 may include more than one of each of these components, e.g., to capture the environment around the satellite navigation device 120 from different positions and angles, and for redundancy.

The camera 310 may be configured to capture images of the environment around the satellite navigation device 120. In some embodiments, the sensor suite 130 may include multiple cameras 310 to capture different views, e.g., a front-facing camera, a back-facing camera, and side-facing cameras. The cameras 310 may be implemented using high-resolution imagers with fixed mounting and field of view.

The LIDAR sensor 320 may be configured use reflected laser light for measuring distances to objects in the vicinity of the satellite navigation device 120. The LIDAR sensor 320 may be a scanning LIDAR that can provide a point-cloud of the region scanned. In various embodiments, the LIDAR sensor 320 may have a fixed field of view or a dynamically configurable field of view.

The radar sensor 330 may be configured to use reflected radio waves for measuring ranges and speeds of objects in the vicinity of the satellite navigation device 120. In various embodiments, the radar sensor 330 may be implemented using a scanning radar with a fixed field of view or a dynamically configurable field of view. Radar sensors 330 may include articulating radar sensors, long-range radar sensors, short-range radar sensors, or any combination thereof.

In some embodiments, other types of TOF sensors, such as TOF cameras, infrared depth sensors, three-dimensional (3D) scanners, structured light scanners, or other types of ranging techniques may be used in the sensor suite 130 in addition to, or instead of, LIDAR and/or radar.

The data collected by the camera 310, LIDAR sensor 320, and radar sensor 330 is used to detect one or more objects surrounding the satellite navigation device 120. For example, the sensor suite 130 may be configured to produce perception data as a data set that can be used by the multipath identification system 150 to determine relative locations and properties of buildings, road side objects, trees, etc., in the vicinity of the satellite navigation device 120. In some embodiments, the locations of the objects determined from the perception data may be locations with respect to the satellite navigation device 120. The one or more properties of the objects determined from the perception data may include a height of an object, a geometric shape and/or features of at least a portion of an object, a material of an object, reflective properties of an object, or any other properties of an object that may affect how the satellite signals incident on an object may be affected (e.g., reflected or refracted). When used in the AV 110, the sensor suite 130 may be configured to produce data that can be used by an onboard computer to detect other cars, pedestrians, trees, bicycles, or objects within a road on which the AV 110 is traveling (such as construction and/or other objects that may impede movement of the vehicle), and indications surrounding the AV 110 (such as construction signs, stop indicators, and other street signs).

Example Vehicle Management System

Figure 4:
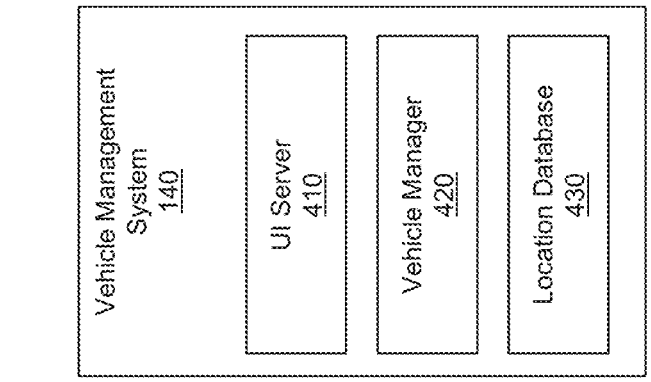
FIG. 4 is a block diagram illustrating a vehicle management system according to some embodiments of the present disclosure.

FIG. 4 is a block diagram illustrating the vehicle management system 140 according to some embodiments of the present disclosure. The vehicle management system 140 may include a user interface (UI) server 410, a vehicle manager 420, and a location database 430. In alternative configurations, different and/or additional components may be included in the vehicle management system 140. Further, functionality attributed to one component of the vehicle management system 140 may be accomplished by a different component included in the vehicle management system 140 or a different system than those illustrated.

The UI server 410 may be configured to communicate with client devices that provide a user interface to users. For example, the UI server 410 may be a web server that provides a browser-based application to client devices, or the UI server 410 may be a mobile app server that interfaces with a mobile app installed on client devices. The UI may enable the user to access a service of the vehicle management system 140, e.g., to request a ride from an AV 110, or to request a delivery from an AV 110. The UI may also enable a person in charge to access a service of the vehicle management system 140 related to collection of data for training the multipath error model, e.g., to request an AV 110 to drive to a particular location or a particular area to collect data using the satellite navigation device 120 and the sensor suite 130.

The vehicle manager 420 may be configured to manage and communicate with a fleet of AVs, including AVs 110a through 110N. The vehicle manager 420 may assign AVs 110 to various tasks and direct the movements of the AVs 110 in the fleet. For example, the vehicle manager 420 assigns a certain AV 110 to perform a service requested by a user to the UI server 410, e.g., to drive to a particular location or a particular area to collect data using the satellite navigation device 120 and the sensor suite 130. The vehicle manager 420 may instruct the AVs 110 to drive to other locations while not servicing a user, e.g., to improve geographic distribution of the fleet, to anticipate demand at particular locations, etc. The vehicle manager 420 may also be configured to instruct the AVs 110 to return to AV facilities for fueling, inspection, maintenance, or storage.

The location database 430 may be configured to store information that would allow the vehicle management system 140 to provide the accurate locations of the satellite navigation device 120 to the multipath identification system 150. The multipath identification system 150 may use the accurate locations provided by the location database 430 to compute accurate distances between the satellite navigation device 120 and the satellites. The multipath identification system 150 may then compare these distances to the distances determined based on the location of the satellites and the TOFs of the signals transmitted by the satellites and received by the satellite navigation device 120. While the location database 430 is shown as a component of the vehicle management system 140, in some embodiments, the location database 430 may be implemented outside of the vehicle management system 140, e.g., in the multipath identification system 150, at a cloud server, etc.

Example Multipath Identification System

Figure 5:
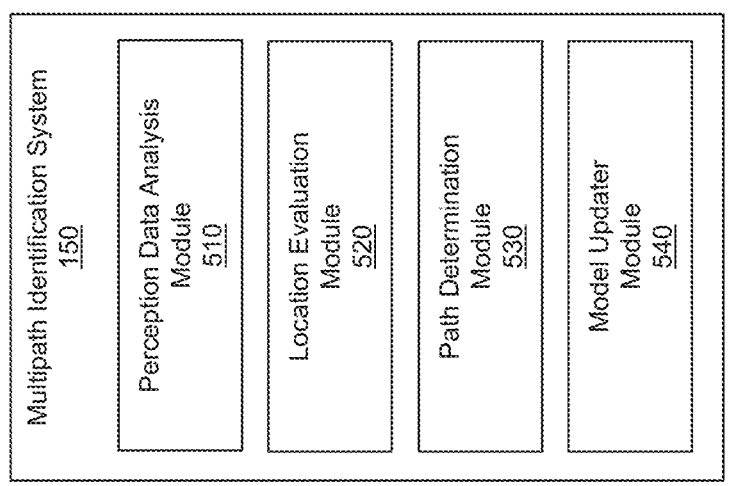
FIG. 5 is a block diagram illustrating a multipath identification system according to some embodiments of the present disclosure.

FIG. 5 is a block diagram illustrating the multipath identification system 150 according to some embodiments of the present disclosure. As shown in FIG. 5, the multipath identification system 150 may include a perception data analysis module 510, a location evaluation module 520, a path determination module 530, and a model updater module 540. In alternative configurations, different and/or additional components may be included in the multipath identification system 150. Further, functionality attributed to one component of the multipath identification system 150 may be accomplished by a different component included in the multipath identification system 150 or a different system than those illustrated.

In general, the perception data analysis module 510 is configured to analyze the perception data generated by the sensor suite 130 to generate a model of the environment surrounding the satellite navigation receiver 120 so that ray tracing can be performed; the location evaluation module 520 is configured to analyze location of the satellites with respect to the satellite navigation receiver 120, also to assist in ray tracing; the path determination module 530 is configured to identify any NLOS paths that may be affecting correct distance determination based on the satellite signals; and the model updater module 540 is configured to update the multipath error model. An example method that may be implemented by the multipath identification system 150 is described with reference to FIG. 9.

Example Multipath Correction System

Figure 6:
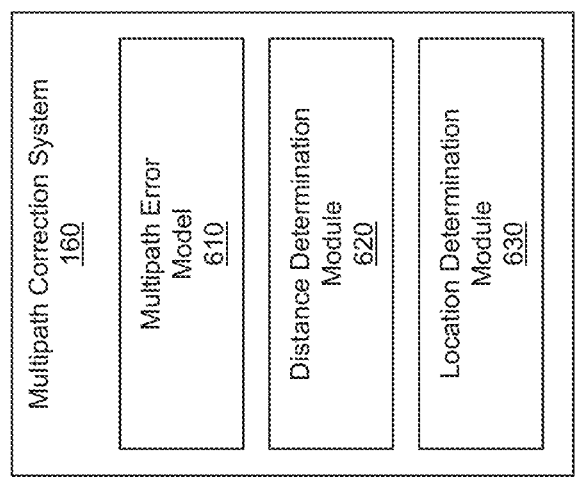
FIG. 6 is a block diagram illustrating a multipath correction system according to some embodiments of the present disclosure.

FIG. 6 is a block diagram illustrating the multipath correction system 160 according to some embodiments of the present disclosure. As shown in FIG. 6, the multipath correction system 160 may include a multipath error model 610, a distance determination module 620, and a location determination module 630. In alternative configurations, different and/or additional components may be included in the multipath correction system 160. Further, functionality attributed to one component of the multipath correction system 160 may be accomplished by a different component included in the multipath correction system 160 or a different system than those illustrated.

In general, the multipath error model 610 is the model generated by the multipath identification system 150 (e.g., a model trained using the method shown in FIG. 9); the distance determination module 620 may be a module similar to the distance determination module 220 described above, but configured to determine the distances corrected for multipath errors using the multipath error model 610; and the location determination module 630 is configured to determine a location of a satellite navigation device (e.g. of a satellite navigation device 720 shown in FIG. 7) based on the distances determined by the distance determination module 620. An example method that may be implemented by the multipath correction system 160 is described with reference to FIG. 11.

Example Electronic Device

Figure 7:
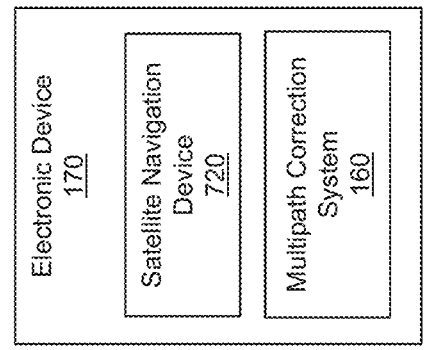
FIG. 7 is a block diagram illustrating an electronic device in which a multipath correction system according to some embodiments of the present disclosure may be implemented.

FIG. 7 is a block diagram illustrating the electronic device 170 according to some embodiments of the present disclosure. As shown in FIG. 7, the electronic device 170 may include a satellite navigation device 720 and the multipath correction system 160. In general, the satellite navigation device 720 may be similar to the satellite navigation device 120 and may include components shown in FIG. 2, except that the satellite navigation device 720 does not need to collect data for training the multipath error model, but simply function as a conventional satellite navigation device that receives signals from multiple satellites. The multipath correction system 160 may correct at least some of the errors in distance determination performed by the distance determination module 220 of the satellite navigation device 720 to enable more accurate determination of the location of the satellite navigation device 720. In various embodiments, the electronic device 170 may be, or may be included in, a mobile phone, a tablet, a wearable device (e.g., a smart watch), a digital camera, an AV, a non-autonomous vehicle, or any other electronic device equipped with the satellite navigation device 720 for providing position information of the electronic device 170. In alternative configurations, different and/or additional components may be included in the electronic device 170. Further, functionality attributed to one component of the electronic device 170 may be accomplished by a different component included in the electronic device 170 or a different system than those illustrated.

Example Scenario

Figure 8:
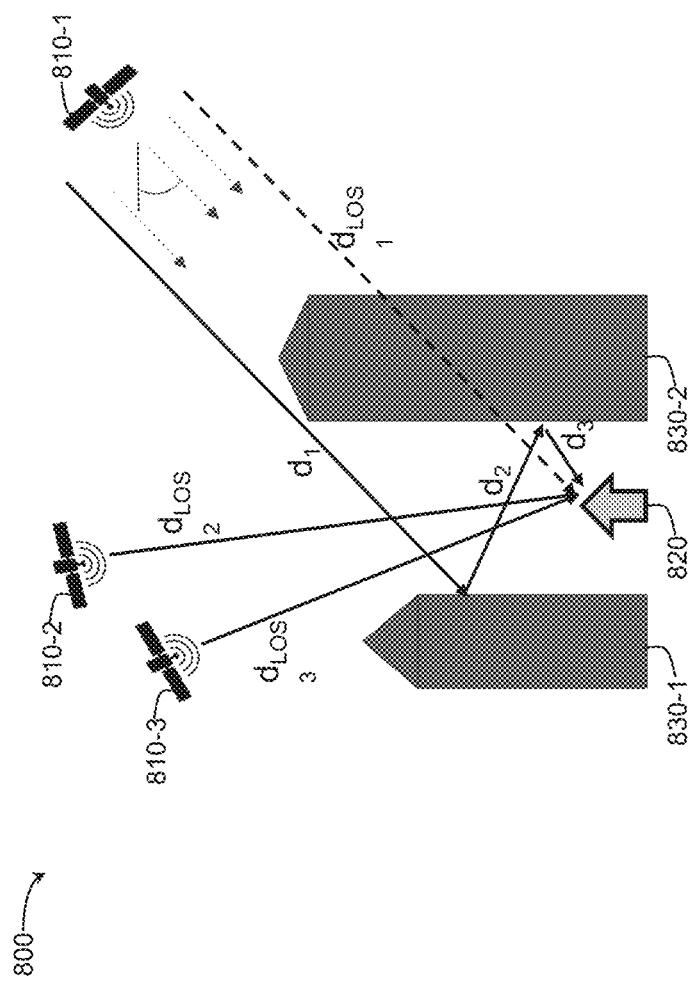
FIG. 8 illustrates an example scenario showing line of sight (LOS) and multipath satellite signals according to some embodiments of the present disclosure.

Example methods for multipath identification and correction will now be described with reference to an example scenario illustrated in FIG. 8. FIG. 8 illustrates an environment 800 in which a satellite navigation device that is supposed to determine its location may be operating. A plurality of satellites 810, shown in FIG. 8 as three example satellites 810-1, 810-2, and 810-3 may be orbiting the Earth and at a certain time may be in locations with respect to the satellite navigation device 820 as shown in FIG. 8. The satellite navigation device 820 may be surrounded by a plurality of objects 830, shown in FIG. 8 as two example objects being buildings 830-1 and 830-2. When the satellites 810 are in certain locations with respect to the satellite navigation device 820, one or more of the objects 830 may obscure the LOS, i.e., may obscure the direct path, from one or more satellites 810 to the satellite navigation device 820, resulting in signals from such satellites reaching the satellite navigation device 820 by multipath. In the example of FIG. 8, this is the case with the satellite 810-1. As shown in FIG. 8, the object 830-2 obscures the direct, LOS, path $d_{LOS1}$ from the satellite 810-1 to the satellite navigation device 820. As a result, the signals from the satellite 810-1 reach the satellite navigation device 820 by a multipath that includes paths $d_1$, $d_2$, and $d_3$, as shown in FIG. 8. The path $d_1$ may be a path of a signal from the satellite 810-1 to the object 830-1, the path $d_2$ may be a path of the signal from the satellite 810-1 reflecting from the object 830-1 and being incident on the object 830-2, and the path $d_3$ may be a path of the signal from the satellite 810-1 reflecting from the object 830-2 to finally be incident on the satellite navigation device 820. FIG. 8 illustrates that signals from the satellites 810-2 and 810-3 are not obscured from any objects, so the paths for those signals are LOS paths $d_{LOS2}$ and $d_{LOS3}$. Of course, in other scenarios and other embodiments, paths for signals from the plurality of the satellites 810 to the satellite navigation device 820 may be different, often more complicated, than those shown in the simple scenario of FIG. 8, all of which scenarios and embodiments being within the scope of the present disclosure.

Example Method for Perception Based Multipath Identification

Figure 9:
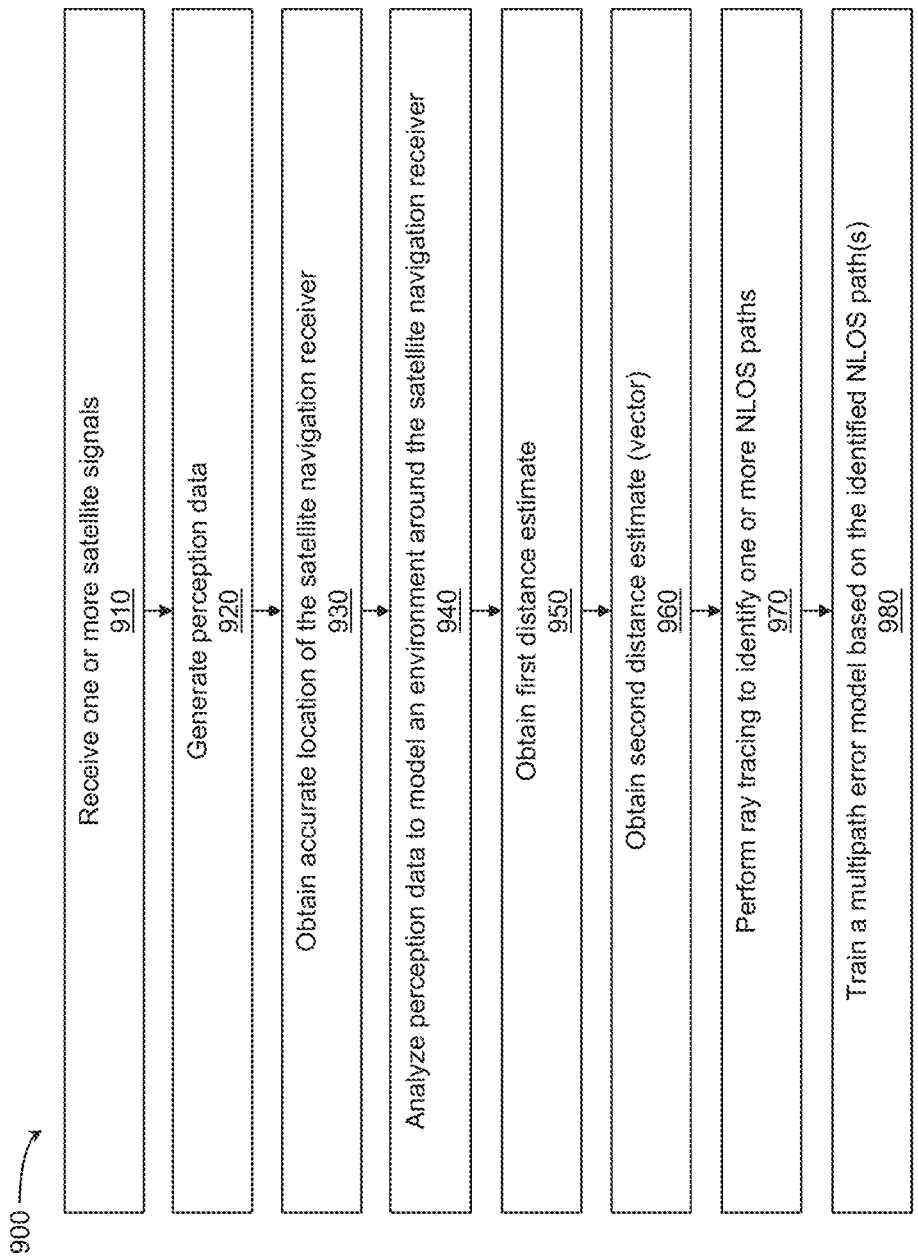
FIG. 9 is a flowchart of an example method for perception data based multipath identification according to some embodiments of the present disclosure.

For the purposes of describing perception data based multipath identification, consider that the satellite navigation device 820 is the satellite navigation device 120 described above, provided along with the sensor suite 130 (e.g., provided in the module 125) for collecting data for training the multipath error model. Operations for training the multipath error model are shown in FIG. 9, providing a flowchart of an example method 900 for perception data based multipath identification according to some embodiments of the present disclosure. Although various steps of the method 900 are shown in a certain order and with respect to the system shown in FIG. 1 and the scenario shown in FIG. 8, in various embodiments, these steps may be performed in a different order (or at least in at least partially overlapping times), and/or by a system different from the one shown in FIG. 1, and/or for the scenarios other than the one shown in FIG. 8.

Steps 910, 920, and 930 involve data collection for training the model, and may be performed in any suitable order or substantially simultaneously with one another.

Step 910 may include obtaining the first component of a given data set (i.e., when the data-collecting satellite navigation device 820 is at a particular location at a particular time of day), namely, the satellite navigation device 820 receiving one or more satellite signals from the satellites 810. At 910, the satellite navigation device 820 may receive a signal from the satellite 810-1, traveled by the NLOS path that includes paths $d_1$, $d_2$, and $d_3$, receive a signal from the satellite 810-2, traveled by the LOS path $d_{LOS2}$, and receive a signal from the satellite 810-3, traveled by the LOS path $d_{LOS3}$.

Step 920 may include obtaining the second component of the data set, namely, the sensor suite 920 generating perception data indicative of the locations and one or more properties of one or more objects in an environment surrounding the satellite navigation device 820. At 920, the sensor suite 920 may generate perception data indicative of the locations of the objects 830 and indicative of one or more properties of the objects 830. For example, the sensor suite 920 may generate perception data indicative of the locations of the objects 830 with respect to the satellite navigation device 820 and indicative of properties such as heights of the objects 830, geometric shapes of the objects 830, materials of which the objects 830 are made (or at least the materials at the outer surface of the objects 830, which materials can be probed by the sensor suite 130), or reflective properties of the objects 830.

Step 930 may include obtaining the third component of the data set, namely, the obtaining the accurate location of the satellite navigation device 820, e.g., from the location database 430.

The data obtained in steps 910, 920, and 930 is provided, or made available, to the multipath identification system 150 so that the multipath identification system 150 can use the data obtained in steps 910, 920, and 930 to perform ray tracing and identify one or more NLOS paths for the satellite signals received in 910.

In order to enable performing ray tracing, the perception data analysis module 510 of the multipath identification system 150 may, in step 940, analyze the perception data collected in 920 to generate a 3D representation of the environment surrounding the satellite navigation receiver 820. For example, the perception data analysis module 510 may model road side objects such as the objects 830 in terms of physical dimension and material types of the objects 830, as well as the locations of the objects 830 with respect to the satellite navigation receiver 820.

Another operation for enabling ray tracing includes the location evaluation module 520 evaluating position of the satellite navigation receiver 820 with respect to the objects 830 and the satellites 810. For example, the location evaluation module 520 may obtain two estimates of the distance between the satellite navigation receiver 820 and the satellite 810-1.

Figure 10:
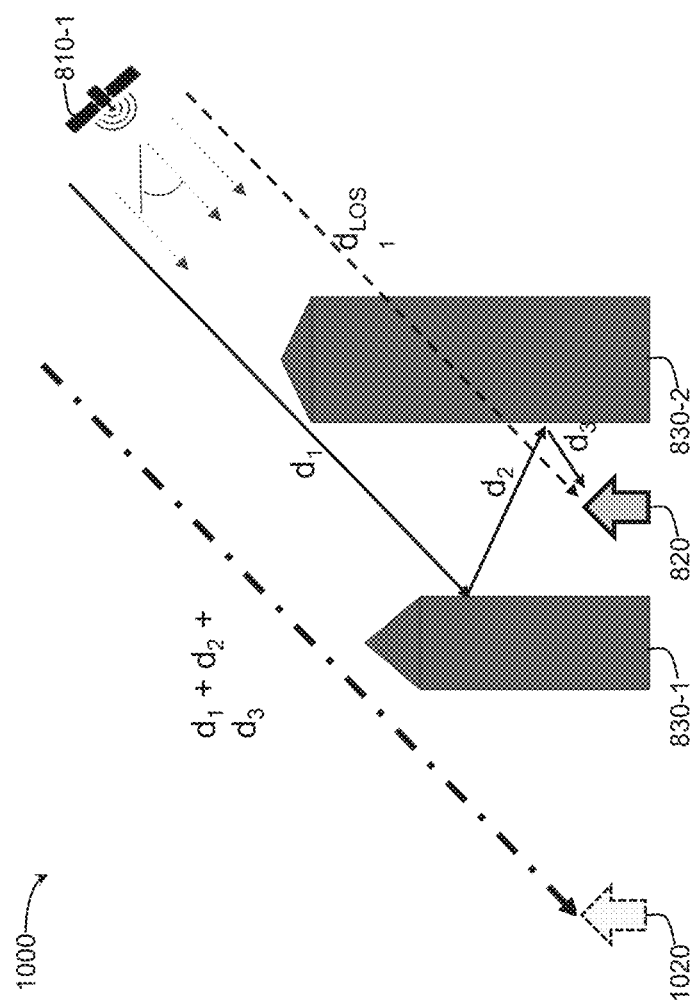
FIG. 10 illustrates an example scenario showing incorrect distance determination to a satellite due to multipath.

The first distance estimate may be obtained in 950 based on the TOF between when the satellite 810-1 transmitted the signal and the time when the satellite navigation receiver 820 received this signal (e.g., determined based on the pseudo-random sequence of bits included the signal transmitted by the satellite 810-1). In some embodiments, the location evaluation module 520 may receive the first distance estimate from the distance determination module 220. In other embodiments, the location evaluation module 520 may receive just the data indicative of the signals received by the antenna 210 in 910 and compute the first distance estimate. In some embodiments, the location evaluation module 520 may compute the first distance estimate because the distance determination module 220 is implemented as a part of the location evaluation module 520. For the scenario shown in FIG. 8, the first distance estimate would be a distance equal to the sum of $d_1$, $d_2$, and $d_3$, which could also be a distance to a satellite navigation receiver 1020 shown in FIG. 10, illustrating substantially the same scenario as the one shown in FIG. 8 except that satellites 810-2 and 810-3 are not shown in order to not clutter the drawing. FIG. 10 provides a clear illustration of how multipath can severely compromise determination of the true distance (i.e., the distance $d_{LOS1}$, shown in FIG. 10) to the satellite 810-1.

The second distance estimate may be obtained, in 960, by the location evaluation module 520 based on the location of the satellite 810-1 (which location is included in the signal from that satellite, received in 910) and the location of the satellite navigation receiver 820 (which location is obtained from the further system in 930). For the scenario shown in FIG. 10, the second distance estimate would be the true distance to the satellite 810-1, the distance $d_{LOS1}$. The locations of the satellite 810-1 and the satellite navigation receiver 820 used for determining the second distance estimate also provide a direction in which the satellite 810-1 is located with respect to the satellite navigation receiver 820. In other words, the second distance estimate obtained as a part of 940 includes determining a vector indicative of the location of the satellite 810-1 with respect to the satellite navigation receiver 820, the vector defined by an angle θ, shown in FIG. 10 (or any angle indicative of the angle θ), and a magnitude, which is the distance $d_{LOS1}$.

In various embodiments, 940, 950, and 960 may be performed in any temporal order with respect to one another, e.g., substantially simultaneously.

Comparison of the first distance estimate obtained in 940 and the second distance estimate computed in 950 may provide the location evaluation module 520 with an indication that the signal received from the satellite 810-1 is a multipath signal. For example, the location evaluation module 520 may be configured to determine whether the difference between the first and second distance estimates is below a certain threshold, e.g., below about 50 centimeters, which may represent an acceptable margin of error. If the difference is above the threshold, the location evaluation module 520 may conclude that the signal received from the satellite 810-1 is a multipath signal. The path determination module 530 of the multipath identification system 150 may then, in step 970, use the results of the perception data analysis obtained in 940 and the vector obtained in 960 to perform ray tracing and identify the exact path that the signal traveled from the satellite 810-1 to reach the satellite navigation receiver 820. As a result, the path determination module 530 may identify that the signal from the satellite 810-1 traveled by the NLOS path that includes paths $d_1$, $d_2$, and $d_3$ to reach the satellite navigation receiver 820 in 910. In general, step 970 may include performing ray tracing by tracing a path of the satellite signal from the satellite 810-1 from being transmitted by the satellite 810-1 to being reflected or refracted by one or more of the plurality of objects 830 to being received by the satellite navigation receiver 820 in step 910.

The NLOS path identifies in 970 may be stored and be used by the model updater module 940 of the multipath identification system 150 to train the multipath error model in step 980. In some embodiments of step 980, the model updater module 940 may use the paths identifies for other satellites from which the signals were received in 910, as well as results of any other steps of the method 900 to update the multipath error model so that the model can provide an improved correction of potential multipath errors in the environment 800. In various embodiments, step 980 may include the model updater module 940 using any suitable artificial intelligence (AI) approaches to training a model, such as supervised machine learning.

As with any AI modeling, using more data to train a multipath error model is likely to make the model more accurate. Therefore, the method 900 is preferably repeated to collect and analyze the data sets obtained for multiple locations of the satellite navigation receiver 820. In some embodiments, the method 900 may also be repeated to collect and analyze the data sets obtained for the same locations of the satellite navigation receiver 820 but at different times of the day. The latter may be advantageous because at different times of the day satellites may be in different positions with respect to a given location. Therefore, paths for satellite signals of a given satellite to a given location of a satellite navigation device may be different for signals transmitted at different times of the day. Consequently, obtaining data sets for the same location but different times of the day may improve model accuracy.

Example Method for Perception Based Multipath Correction

Figure 11:
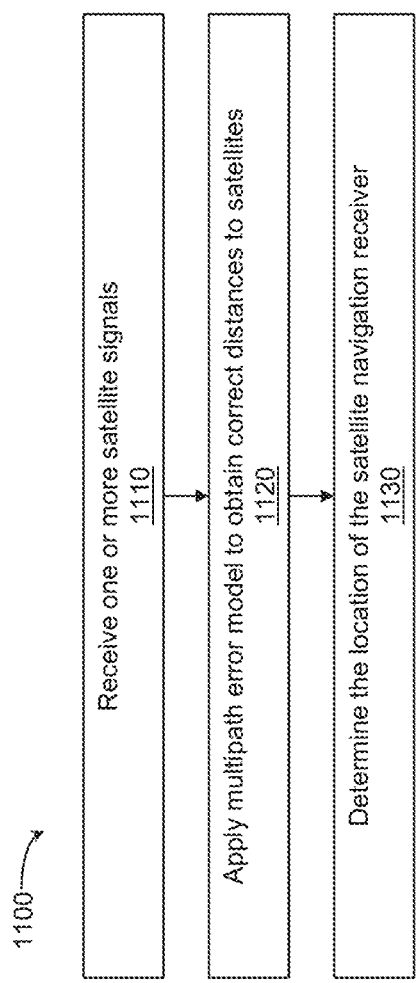
FIG. 11 is a flowchart of an example method for perception data based multipath correction according to some embodiments of the present disclosure.

For the purposes of describing perception data based multipath correction, consider that the satellite navigation device 820 is the satellite navigation device 720 included in the electronic device 170, described above. FIG. 11 provides a flowchart of an example method 1100 for perception data based multipath correction according to some embodiments of the present disclosure. Although various steps of the method 1100 are described with reference to an electronic device 170 shown in FIG. 7 and the scenario shown in FIG. 8, these steps may be performed by a device other than the one shown in FIG. 1, and/or for the scenarios other than the one shown in FIG. 8.

The method 1100 may begin with step 1110 that includes the satellite navigation device 720 receiving at least one, but typically a plurality, of satellite signals. At 910, the satellite navigation device 720 may receive a signal from the satellite 810-1, traveled by the NLOS path that includes paths $d_1$, $d_2$, and $d_3$, receive a signal from the satellite 810-2, traveled by the LOS path $d_{LOS2}$, and receive a signal from the satellite 810-3, traveled by the LOS path $d_{LOS3}$.

Step 1120 may include applying the multipath error model 610 of the multipath correction system 160 to the signals received in 1110 to correct for at least some of the errors related to multipath and to determine, e.g., by the distance determination module 620, correct distances to each of the satellites. Applying the multipath error model 610 in step 1120 results in the distance determination module 620 of the multipath correction system 160 determining distances to satellites 810-1, 810-2, and 810-3 as, respectively, distances $d_{LOS1}$, $d_{LOS2}$, and $d_{LOS3}$, shown in FIG. 8. Thus, even though the TOF for the signal received from the satellite 810-1 indicates that the distance from the satellite navigation device 720 to the satellite 810-1 is a sum of $d_1$, $d_2$, and $d_3$, applying the multipath error model 610 corrects for the error (i.e., the difference between the sum of $d_1$, $d_2$, and $d_3$ and the true distance $d_{LOS1}$).

Step 1130 may include the location determination module 630 of the multipath correction system 160 determining the location of the satellite navigation device 720 based on the distances determined in step 1120. In various embodiments, the location determination module 630 may be a module similar to the location determination module 230, described above, e.g., may be a conventional location determination module, configured to determine the location based on the distances to satellites using any of the known techniques.

In this manner, the electronic device 170 is able to improve its accuracy in location determination based on signals received by the satellite navigation device 720.

Example Data Processing System

Figure 12:
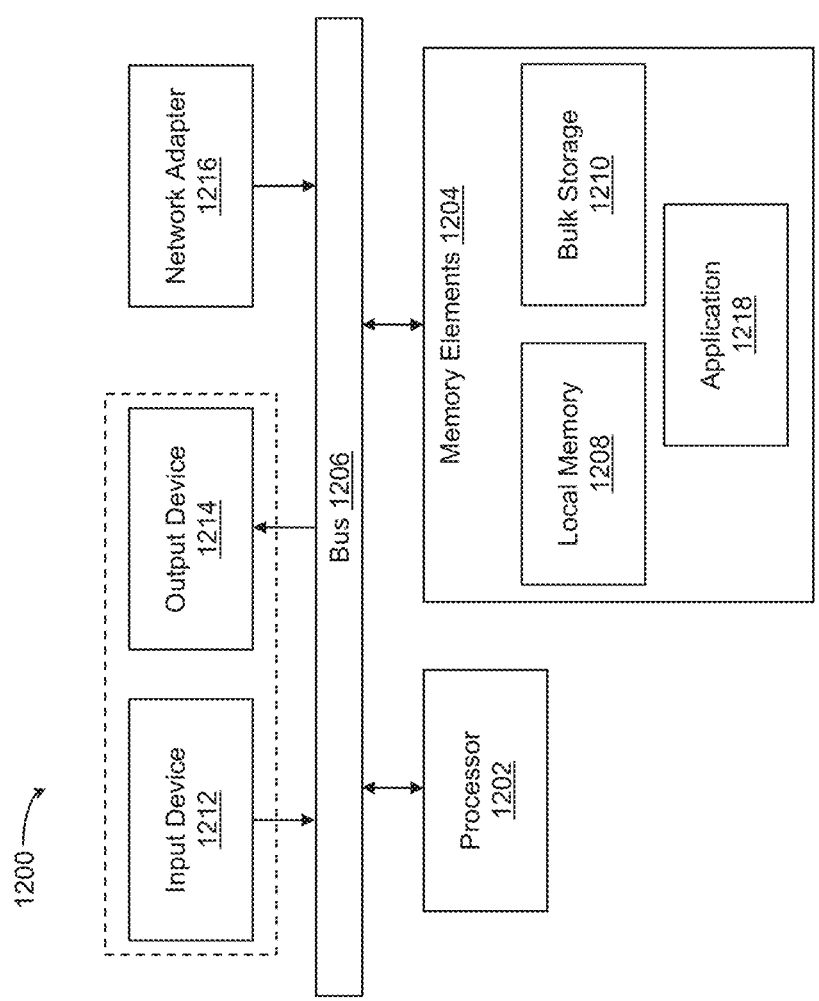
FIG. 12 is a block diagram illustrating a data processing system that may be used to implement various aspects of perception data based multipath identification and correction according to some embodiments of the present disclosure.

FIG. 12 provides a block diagram illustrating an example data processing system 1200 that may be configured to implement, or control implementations of, at least portions of perception based multipath identification and correction as described herein. For example, in some embodiments, the data processing system 1200 may implement at least portions of any components of the multipath identification system 150 or multipath correction system 160. In some embodiments, the data processing system 1200 may implement at least portions of any components of the satellite navigation device 120, the sensor suite 130, the vehicle management system 140, or the electronic device 170.

As shown in FIG. 12, the data processing system 1200 may include at least one processor 1202, e.g. a hardware processor 1202, coupled to memory elements 1204 through a system bus 1206. As such, the data processing system may store program code within memory elements 1204. Further, the processor 1202 may execute the program code accessed from the memory elements 1204 via a system bus 1206. In one aspect, the data processing system may be implemented as a computer that is suitable for storing and/or executing program code. It should be appreciated, however, that the data processing system 1200 may be implemented in the form of any system including a processor and a memory that is capable of performing the functions related to perception based multipath identification and correction, described within this disclosure.

In some embodiments, the processor 1202 can execute software or an algorithm to perform the activities described herein, in particular activities related to implementing perception based multipath identification and correction as described herein. The processor 1202 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 1202 may be communicatively coupled to the memory element 1204, for example in a direct-memory access (DMA) configuration, so that the processor 1202 may read from or write to the memory elements 1204.

In general, the memory elements 1204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-7, can also include suitable interfaces for receiving, transmitting, and/or otherwise communicating data or information in a network environment so that they can communicate with, e.g., the data processing system 1200 of another one of these elements.

In certain example implementations, mechanisms for perception based multipath identification and correction as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1204 shown in FIG. 12, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1202 shown in FIG. 12, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1204 may include one or more physical memory devices such as, for example, local memory 1208 and one or more bulk storage devices 1210. The local memory may refer to RAM or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from the bulk storage device 1210 during execution.

As shown in FIG. 12, the memory elements 1204 may store an application 1218. In various embodiments, the application 1218 may be stored in the local memory 1208, the one or more bulk storage devices 1210, or apart from the local memory and the bulk storage devices. It should be appreciated that the data processing system 1200 may further execute an operating system (not shown in FIG. 12) that can facilitate execution of the application 1218. The application 1218, being implemented in the form of executable program code, can be executed by the data processing system 1200, e.g., by the processor 1202. Responsive to executing the application, the data processing system 1200 may be configured to perform one or more operations or method steps described herein.

I/O devices depicted as an input device 1212 and an output device 1214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1214 may be any type of screen display, such as plasma display, liquid crystal display (LCD), organic light emitting diode (OLED) display, electroluminescent (EL) display, or any other indicator, such as a dial, barometer, or light emitting diodes (LEDs). In some implementations, the system may include a driver (not shown) for the output device 1214. Input and/or output devices 1212, 1214 may be coupled to the data processing system either directly or through intervening I/O controllers.

In an embodiment, the input and the output devices may be implemented as a combined input/output device (illustrated in FIG. 12 with a dashed line surrounding the input device 1212 and the output device 1214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1216 may also, optionally, be coupled to the bus 1206 to enable the data processing system to become coupled to other systems, computer systems, remote network devices, and/or remote storage devices through intervening private or public networks. The network adapter may comprise a data receiver for receiving data that is transmitted by said systems, devices and/or networks to the data processing system 1200, and a data transmitter for transmitting data from the data processing system 1200 to said systems, devices and/or networks. Modems, cable modems, and Ethernet cards are examples of different types of network adapter that may be used with the data processing system 1200.

SELECT EXAMPLES

The following paragraphs provide some examples of various embodiments disclosed herein.

Example 1 provides a system for updating a model for determining distances to a plurality of satellites. The system includes a satellite navigation device (e.g., a GNSS receiver), a sensor suite that includes one or more sensors (e.g., a camera, a LIDAR sensor, a RADAR sensor, etc.), and a multipath identification system. The satellite navigation device is configured to receive a first satellite signal from a first satellite of the plurality of satellites. The sensors suite is configured to generate perception data indicative of a location and one or more properties of each of a plurality of objects in an environment surrounding the satellite navigation device. The multipath identification system is configured to obtain a location of the satellite navigation device from a further system, determine a NLOS path for the first satellite signal, where the NLOS path is indicative of the first satellite signal interacting with the plurality of objects in the environment surrounding the satellite navigation device before being received by the satellite navigation device and where the NLOS path is determined based on the perception data, a location of the first satellite as obtained from the first satellite signal, and the location of the satellite navigation device as obtained from the further system, and update the model based on the NLOS path.

Example 2 provides the system according to example 1, where the multipath identification system is further configured to obtain a first estimate and a second estimate for a distance between the satellite navigation device and the first satellite. In such an example, the first estimate is computed based on a TOF determined based on ranging information in the first satellite signal (e.g., determined from pseudo-range calculated from the TOF of the first satellite signal), the second estimate is computed based on the location of the satellite navigation device obtained from the further system and a location of the first satellite obtained from the first satellite signal, and the NLOS path is determined based on the first estimate and the second estimate.

Example 3 provides the system according to example 2, where the NLOS path is determined as a path that accounts for a difference between the first estimate and the second estimate.

Example 4 provides the system according to examples 2 or 3, where the NLOS path is determined when a difference between the first estimate and the second estimate is greater than a threshold.

Example 5 provides the system according to any one of the preceding examples, where the multipath identification system is configured to determine the NLOS path by performing ray tracing based on the perception data, the location of the first satellite as obtained from the first satellite signal, and the location of the satellite navigation device as obtained from the further system.

Example 6 provides the system according to example 5, where performing the ray tracing includes tracing a path of the first satellite signal from being transmitted by the first satellite to being reflected or refracted by one or more of the plurality of objects to being received by the satellite navigation device.

Example 7 provides the system according to any one of the preceding examples, where the one or more properties of an object of the plurality of objects includes one or more of: a height of the object, a geometric shape of at least a portion of the object, a material of the object, and reflective properties of the object.

Example 8 provides the system according to any one of the preceding examples, where the location of the each of the plurality of objects is a location of the each of the plurality of objects relative to the satellite navigation device.

Example 9 provides the system according to any one of the preceding examples, where the first satellite signal interacting with the plurality of objects includes one or more of: the first satellite signal being reflected from one or more of the plurality of objects, and the first satellite signal being refracted by one or more of the plurality of objects.

Example 10 provides the system according to any one of the preceding examples, where the multipath identification system is configured to determine a plurality of paths of satellite signals received by the satellite navigation device when the satellite navigation device is at different locations, the NLOS path is one of a plurality of the plurality of paths determined by the multipath identification system, and the multipath identification system is configured to update the model based on the plurality of paths.

Example 11 provides the system according to any one of the preceding examples, where the multipath identification system is configured to determine a plurality of paths of satellite signals received by the satellite navigation device at different times of day, the NLOS path is one of a plurality of the plurality of paths determined by the multipath identification system, and the multipath identification system is configured to update the model based on the plurality of paths.

Example 12 provides a method for updating a model for determining distances to satellites. The method includes obtaining data indicative of a satellite signal transmitted by a satellite and received by a satellite navigation device; obtaining a location of the satellite navigation device from a further system; using the location of the satellite navigation device obtained from the further system and a location of the satellite included in the satellite signal to determine an angle and a magnitude of a vector between the satellite navigation device and the satellite; receiving perception data acquired by one or more sensors, the perception data indicative of a location and one or more properties of each of a plurality of objects in a vicinity of the satellite navigation device; using the angle and the magnitude of the vector and using the perception data to perform ray tracing to determine a path traveled by the satellite signal to the satellite navigation device; and updating the model based on the path.

Example 13 provides the method according to example 12, where determining the magnitude of the vector includes computing a distance between the satellite navigation device and the satellite based on the location of the satellite navigation device obtained from the further system, and further based on the location of the satellite included in the satellite signal.

Example 14 provides the method according to examples 12 or 13, further including computing an estimate for a distance between the satellite navigation device and the satellite based on a TOF of the satellite signal (i.e., computing the first estimate based on a time when the satellite transmitted the satellite signal and a time when the satellite navigation device received the satellite signal), where the ray tracing is performed further based on the computed estimate.

Example 15 provides the method according to example 14, further including determining a difference between the estimate and the magnitude of the vector, where the ray tracing is performed when the difference is greater than a threshold.

Example 16 provides the method according to any one of examples 12-15, where the one or more properties include one or more of a height, a material, and reflective properties.

Example 17 provides the method according to any one of examples 12-16, where steps of obtaining the data, obtaining the location, using the location, receiving the perception data, using the angle and the magnitude of the vector, and updating the model are performed iteratively for a plurality of locations of the satellite navigation receiver.

Example 18 provides the method according to any one of examples 12-17, where steps of obtaining the data, obtaining the location, using the location, receiving the perception data, using the angle and the magnitude of the vector, and updating the model are performed iteratively for a plurality of locations of the satellite.

Example 19 provides an electronic device that includes a satellite navigation device (e.g., a GNSS receiver) and a multipath correction system. The satellite navigation device is configured to receive satellite signals from a plurality of satellites. The multipath correction system is configured to use a multipath error model to determine a distance to each of the plurality of satellites based on the received satellite signals, where the multipath error model is based on perception data describing locations and properties of a plurality of objects in an environment surrounding the satellite navigation device and further based on a location of the satellite navigation device obtained from a further system. The satellite navigation device is further configured to determine a location of the electronic device based on the distance to each of the plurality of satellites determined by the multipath correction system.

Example 20 provides the electronic device according to example 19, where the electronic device is one of a mobile phone, a tablet, or a wearable device.

Example 21 provides a vehicle that includes a system for updating a model for determining distances to a plurality of satellites according to any one of the preceding examples (e.g., a system according to any one of examples 1-11).

Example 22 provides the vehicle according to example 21, where the vehicle is an AV.

Example 23 provides the vehicle according to examples 21 or 22, where the vehicle is an automobile, a boat, an unmanned aerial vehicle, a driverless car, etc.

Example 24 provides a method, including steps performed by a system or a device according to any one of the preceding examples (e.g., performed by a system for updating a model for determining distances to a plurality of satellites according to any one of examples 1-11 or performed by an electronic device according to any one of examples 19-20).

Example 25 provides a method, including steps that cause a system to operate according to any one of the preceding examples (e.g., a system for updating a model for determining distances to a plurality of satellites according to any one of examples 1-11 or an electronic device according to any one of examples 19-20).

Example 26 provides a non-transitory computer-readable storage medium storing instructions which, when executed by a processor, cause the processor to perform at least portions of the methods according to any one of examples 12-18, 24, and 25.

Example 27 provides a computer program product including instructions which, when executed by a processor, cause the processor to perform at least portions of the methods according to any one of examples 12-18, 24, and 25.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the present disclosure, to limit this disclosure in any way that is not otherwise reflected in the appended claims.

The invention claimed is:

1. A method for assisting a satellite-based navigation system, the method comprising:
receiving data indicative of a satellite signal transmitted by a satellite and received by a satellite navigation device;
receiving a location of the satellite navigation device;
determining a vector between the satellite navigation device and the satellite based on the location of the satellite navigation device and a location of the satellite included in the satellite signal;
receiving perception data indicative of a location and one or more properties of individual objects of a plurality of objects in a vicinity of the satellite navigation device;

performing ray tracing based on the vector and the perception data to estimate a path traveled by the satellite signal to be received by the satellite navigation device; and updating a computer-implemented model for assisting the satellite-based navigation system based on the path.

2. The method according to claim 1, wherein determining the vector includes computing a distance between the satellite navigation device and the satellite based on the location of the satellite navigation device and the location of the satellite.

3. The method according to claim 1, wherein determining the vector includes determining an angle of the vector and a magnitude of the vector.

4. The method according to claim 3, wherein performing ray tracing based on the vector includes performing ray tracing based on at least one of the angle of the vector or the magnitude of the vector.

5. The method according to claim 1, further including:
determining an estimate for a distance between the satellite navigation device and the satellite based on a time of flight of the satellite signal, wherein performing ray tracing includes performing ray tracing further based on the estimate.

6. The method according to claim 5, further including determining a difference between the estimate and a magnitude of the vector, wherein performing ray tracing includes performing ray tracing when the difference is greater than a threshold.

7. The method according to claim 1, wherein the one or more properties include at least one of a height, a material, and a property indicative of reflectance.

8. The method according to claim 1, wherein receiving the data, receiving the location of the satellite navigation device, determining the vector, receiving the perception data, performing ray tracing, and updating the computer-implemented model are performed iteratively for a plurality of locations of the satellite navigation receiver.

9. The method according to claim 1, wherein receiving the data, receiving the location of the satellite navigation device, determining the vector, receiving the perception data, performing ray tracing, and updating the computer-implemented model are performed iteratively for a plurality of locations of the satellite.

10. The method according to claim 1, wherein the computer-implemented model for assisting the satellite-based navigation system is a computer-implemented model for determining distances to satellites.

11. A system, comprising:
a satellite navigation device, to receive a satellite signal transmitted by a satellite;
one or more sensors, to generate perception data indicative of a location and one or more properties of individual objects of a plurality of objects in an environment near the satellite navigation device; and
a multipath identification system, to:
estimate a path traveled by the satellite signal from the satellite to the satellite navigation device, wherein the path is estimated based on the perception data, a location of the satellite indicated by the satellite signal, and a location of the satellite navigation device, and wherein the path is indicative of an interaction of the satellite signal with at least one of the plurality of objects before the satellite signal is received by the satellite navigation device,
obtain a first estimate and a second estimate for a distance between the satellite navigation device and the satellite, wherein the first estimate is based a time of flight of the satellite signal, and the second estimate is based on the location of the satellite navigation device and the location of the satellite indicated by the satellite signal, and
update a computer-implemented model for determining a distance to the satellite based on the path, the first estimate, and the second estimate.

12. The system according to claim 11, wherein the multipath identification system is to estimate the path as a path that accounts for a difference between the first estimate and the second estimate.

13. The system according to claim 11, wherein the multipath identification system is to estimate the path when a difference between the first estimate and the second estimate is greater than a threshold.

14. The system according to claim 11, wherein the multipath identification system is to estimate the path by performing ray tracing based on the perception data, the location of the satellite indicated by the satellite signal, and the location of the satellite navigation device.

15. The system according to claim 11, wherein the path is a non-line-of-sight (NLOS) path.

16. The system according to claim 11, wherein the satellite is one of a plurality of satellites, and the computer-implemented model is for determining distances to the plurality of satellites.

17. The system according to claim 11, wherein the system is one of a mobile phone, a tablet, or a wearable device.

18. A vehicle, comprising:
a satellite navigation device, to receive a satellite signal transmitted by a satellite;
one or more sensors, to generate perception data indicative of a location and one or more properties of one or more objects of a plurality of objects in an environment near the satellite navigation device; and
a multipath correction system, to use a multipath error model to determine a distance to the satellite, wherein the multipath error model is based on:
a location of the satellite navigation device obtained from a further system,
a path determined for the satellite signal, wherein the path is indicative of an interaction of the satellite signal with at least one of the plurality of objects before the satellite signal is received by the satellite navigation device, and wherein the path is determined based on the perception data, a location of the satellite obtained from the satellite signal, and the location of the satellite navigation device obtained from the further system, and
a first estimate and a second estimate for a distance between the satellite navigation device and the satellite, wherein the first estimate is based on a time of flight of the satellite signal, and the second estimate is based on the location of the satellite navigation device obtained from the further system and the location of the satellite obtained from the satellite signal.

19. The vehicle according to claim 18, wherein the satellite navigation device is further to determine a location of the vehicle based on the distance to the satellite determined by the multipath correction system.

20. The vehicle according to claim 18, wherein the vehicle is an autonomous vehicle.

* * * * *